(12) United States Patent
Mody

(10) Patent No.: US 9,195,615 B2
(45) Date of Patent: Nov. 24, 2015

(54) METHOD AND APPARATUS TO RECORD, ARCHIVE, AND PLAYBACK COMPUTER MONITOR OUTPUT

(75) Inventor: Jyoti Mody, Frisco, TX (US)

(73) Assignee: Jyoti Mody Hawkvue LLC, San Clemente, CA (US)

( * ) Notice: Subject to any disclaimer, the term of this patent is extended or adjusted under 35 U.S.C. 154(b) by 497 days.

(21) Appl. No.: 13/555,158

(22) Filed: Jul. 22, 2012

(65) Prior Publication Data

US 2013/0038617 A1  Feb. 14, 2013

Related U.S. Application Data

(60) Provisional application No. 61/574,805, filed on Aug. 11, 2011.

(51) Int. Cl.
*G09G 5/00* (2006.01)
*G06T 1/60* (2006.01)
*G06F 13/00* (2006.01)
*G06F 3/14* (2006.01)
*H04N 1/00* (2006.01)

(52) U.S. Cl.
CPC .............. *G06F 13/00* (2013.01); *G06F 3/1423* (2013.01); *H04N 1/00326* (2013.01)

(58) Field of Classification Search
CPC ............................................ G09G 5/00–5/008
USPC ........................................ 345/1.1; 386/326
See application file for complete search history.

(56) References Cited

U.S. PATENT DOCUMENTS

| 2007/0217765 A1* | 9/2007 | Itoh et al. ...................... 386/117 |
| 2008/0055191 A1* | 3/2008 | Craig et al. .................... 345/2.2 |
| 2010/0195976 A1* | 8/2010 | Abe et al. ....................... 386/68 |

* cited by examiner

*Primary Examiner* — Jacinta M Crawford

(57) ABSTRACT

A recording apparatus for storing a screen output of at least one display device is disclosed. The at least one display device is connected to at least one processing unit for receiving a plurality of display signals forming the screen output and the recording apparatus is connected to at least one processing unit in a way that the recording apparatus functions independent of the connected processing unit. A recorder is capturing the screen output from the replica of the plurality of display signals thereon and stores into a data repository. An output interface is provided for playing the screen output on an user interface including a mobile device, or a web page or a third party application in communication with the recording apparatus. The recording apparatus may also be accessed from the remote users such that the recorded information may be accessed and played back.

20 Claims, 4 Drawing Sheets

METHOD AND APPARATUS TO RECORD, ARCHIVE, AND PLAYBACK COMPUTER MONITOR OUTPUT

CROSS REFERENCE TO RELATED APPLICATION

This application is based upon and claims the benefit of priority from U.S. Provisional Application Ser. No. 61/574,805 filed on Aug. 11, 2011; the entire contents of which are incorporated herein by reference.

TECHNICAL FIELD

The present disclosure generally relates to a recording apparatus. In particular, the present disclosure relates to a method, a recording apparatus and a system for capturing and storing a screen output of at least one display device.

BACKGROUND

Conventionally, the recording apparatus are dependent on the processing unit i.e., the recording apparatus are configured to be a part of the processing unit and configured for capturing the screen output of only a monitor attached to the processing unit. These recording apparatus capture the screen output with the help of a software. The software receives specific user instructions for capturing screen output on a particular time or date. Further, the software instructs the recording apparatus to capture and store the screen output on the specified time or date. Hence, these recording apparatus captures and stores the screen output on the specified instructions of the user.

Further, these recording apparatus have no provision for defining or co-relating with an event for automatically capturing screen output when a fault in processing unit or transmission of display signals, etc. is detected. For instance, in critical applications, rebuilding the scenario after a critical failure event is of utmost importance. Normally, conventional recording apparatus make use of video tapes, transaction logs and audit databases to rebuild the scenario to find the actual cause. This rebuilding process may take several days to several weeks to exactly pin point the cause particularly when one or more computer operators are involved to make a key decision. These recording apparatus have no provisions for defining a critical failure event for automatically capturing the scenario.

For example, aircrafts involve a "Black Box" recorder that records every event within the aircraft. In case of a critical failure or a catastrophic event, investigation teams rebuild the scenario based on "black box" readings. Correctly decoding the readings may take a few days and re-constructing the event may require experienced manpower that increases costs and expenses.

Similar critical failures or disaster situations may happen within manufacturing plants (e.g. Oil Gas Platform, pharmaceutical plant, etc). Normally, databases are designed to store key variables and transaction data such as audit logs, input/output signals, digital and analog values, quality readings, security accesses, personnel logs, alarm database, etc with real-time history. Reading and analyzing the large amount of data and re-constructing the event become a cumbersome task and experienced manpower may be required to decode the readings.

Further, capturing screen outputs from multiple screens is not possible using the conventional recording apparatus as one recording apparatus is fixed within one processing unit. For capturing screen output of multiple screens, many recording apparatus will be used thereby increasing the cost and configuration time. In addition, screen capture programs may interfere with existing running applications and memory within primary processing units.

Conventional recording apparatus depend upon the primary memory of the processing unit to store the captured screen outputs. These recording apparatus do not have any internal memory for storage of captured screen outputs thereby occupying the primary memory of the processing unit.

Retrieving and playing the stored screen output on a separate screen or on a separate platform such as web portal or a mobile device is also cumbersome as the conventional recording apparatus uses the capabilities of the processing unit for playing the screen output on the separate platform. The processing unit may or may not have these capabilities of playing the recorded screen outputs on the separate platform.

In order to obviate at least one or more of the aforementioned problems, there is a well-felt need to provide an improved method, a recording apparatus and a system for capturing and storing a screen output of at least one display device.

SUMMARY

A recording apparatus for storing a screen output of at least one display device is disclosed. The at least one display device is connected to at least one processing unit for receiving a plurality of display signals forming the screen output and the recording apparatus is connected to the at least one processing unit in a way that the recording apparatus functions independent of the connected processing unit. The recording apparatus comprises of a splitter being connected to the at least one processing unit and configured for generating a replica of the plurality of display signals corresponding to the screen output. An input interface is provided for receiving the replica of the plurality of display signals from the splitter. A recorder is provided for receiving the replica of the plurality of display signals from the input interface and capturing the screen output from the replica of the plurality of display signals thereon. A data repository is provided for storing the screen output.

The recording apparatus further comprises of an output interface for playing the screen output on an user interface in communication with the recording apparatus. According to an embodiment of the disclosure, the user interface is a screen or a monitor.

The recording apparatus further comprises of a third party interface for communicating with a third party application for displaying the screen output to the users of the third party application.

The recording apparatus further comprises of a web interface for displaying the screen output on a web page or a web portal.

The recording apparatus further comprises of a mobile interface for communicating with one or more mobile devices for displaying the screen output.

The recording apparatus further comprises of an event module for retrieving the stored screen output from the data repository upon triggering of an event and forwarding the screen output to the output interface for play back.

According to another embodiment of the disclosure, the recording apparatus is an image recorder.

According to another embodiment of the disclosure, the screen output is an image.

According to another embodiment of the disclosure, the splitter is a display splitter.

According to another embodiment of the disclosure, the recording apparatus is being connected to the processing unit via a cable.

According to another embodiment of the disclosure, the recording apparatus is a portable device connected between the processing unit and the display device such that the plurality of display signals from the processing unit are routed to the display device through the recording apparatus. The recording apparatus further configured for generating the replica of the plurality of display signals received from the processing unit; capturing the screen output from the replica of the plurality of display signals and storing the screen outputs in the data repository.

According to yet another embodiment of the disclosure, the processing unit is connected to plurality of display devices and the recording apparatus is configured for routing the plurality of display signals from the processing unit to the plurality of display devices such that each display device receives a plurality of display signals. The recording apparatus is further configured for generating the replica of the plurality of display signals for each of the plurality of display devices, received from the processing unit; capturing a plurality of screen outputs from the replica of the plurality of display signals for each of the plurality of display devices and storing the screen outputs in the data repository.

According to yet another embodiment of the disclosure, a plurality of display devices are configured to receive the plurality of display signals from a plurality of processing units such that each processing unit is transmitting the plurality of display signals to each display device. The recording apparatus is configured to route the plurality of display signals from each processing units to the plurality of display devices, such that a replica of the plurality of display signals from the plurality of processing unit is captured and stored in the data repository.

A method of storing a screen output of at least one display device on a recording apparatus is also disclosed. The at least one display device is connected to at least one processing unit for receiving a plurality of display signals forming the screen output and the recording apparatus being connected to the at least one processing unit in a way that the recording apparatus functions independent of the connected processing unit. The method comprises of generating a replica of the plurality of display signals by the recording apparatus such that the replica of the plurality of display signals corresponds to the screen output. Further, the screen output corresponding the replica of the plurality of display signals is stored in the recording apparatus.

According to an embodiment of the disclosure, generating the replica of the plurality of display signals includes splitting the plurality of display signals such that the plurality of display signals are directed to the at least one display device and the replica of the plurality of display signals are directed to the recording apparatus.

According to another embodiment of the disclosure, storing the replica of the plurality of display signals includes capturing the screen output from the replica of plurality of display signals and thereon storing the screen output in the recording apparatus.

A method of identifying an event by playing stored screen output of at least one display device is also disclosed. The at least one display device is connected to at least one processing unit for receiving a plurality of display signals corresponding to the screen output. The screen output is stored on a recording apparatus, which records a replica of the plurality of display signals sent from the at least one processing unit to the at least one display device. The method comprises of retrieving the stored screen output from a data repository of the recording apparatus upon identifying the event and playing the stored screen output onto a user interface in communication with the recording apparatus as a sequence of images.

The method further comprises of retrieving the stored screen output from the data repository of the recording apparatus upon triggering of a user-defined parameter. The user-defined parameter is a condition provided by the user to execute the stored screen output. Further, the stored screen output is played onto the user interface in communication with the recording apparatus as a sequence of images.

According to an embodiment of the disclosure, playing the stored screen output includes playing the stored screen output as the sequence of images in any chronological order as described by the condition of the user defined parameter.

According to another embodiment of the disclosure, retrieving the stored screen output from the data repository of the recording apparatus upon an error in the processing unit or a fault in the transmission of the plurality of display signals to the display device.

A system is also disclosed. The system comprises of at least one processing unit for transmitting a plurality of display signals and at least one display device connected to at least one processing unit for receiving the plurality of display signals forming a screen output. A recording apparatus configured between at least one processing unit and at least one display device such that the recording device is configured to record and store a replica of the plurality of display signals transmitted from at least one processing unit to at least one display unit. The recording apparatus comprises of a splitter connected to at least one processing unit and configured for generating a replica of the plurality of display signals corresponding to the screen output. An input interface is provided for receiving the replica of the plurality of display signals from the splitter. A recorder is provided for receiving the replica of the plurality of display signals from the input interface and capturing the screen output from the replica of the plurality of display signals thereon. A data repository is provided for storing the screen output.

BRIEF DESCRIPTION OF FIGURES

To further clarify the above and other advantages and features of the present disclosure, a more particular description of the disclosure will be rendered with reference to specific embodiments thereof, which are illustrated in the appended drawings. It is appreciated that these drawings depict only typical embodiments of the disclosure and are therefore not to be considered limiting in their scope. The disclosure will be described and explained with additional specificity and detail with the accompanying drawings in which.

DETAILED DESCRIPTION

Figure 1:
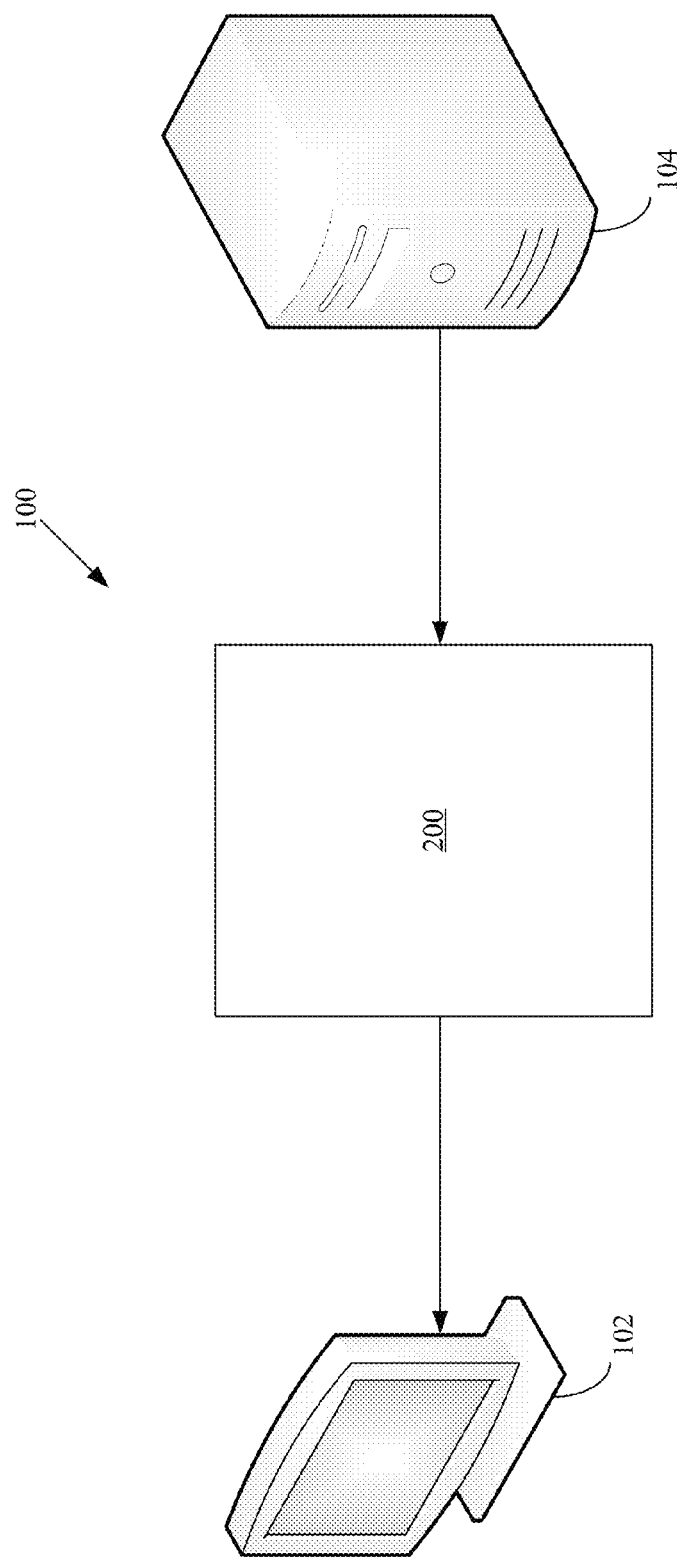
FIG. 1 illustrates a block diagram of a system in accordance with an embodiment of the disclosure.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof. Throughout the patent specification, a convention employed is that in the appended drawings, like numerals denote like components.

Reference throughout this specification to "an embodiment", "another embodiment" or similar language means that a particular feature, structure, or characteristic described in connection with the embodiment is included in at least one embodiment of the present disclosure. Thus, appearances of the phrase "with an embodiment", "with another embodiment" and similar language throughout this specification may, but do not necessarily, all refer to the same embodiment.

A recording apparatus for storing a screen output of at least one display device is disclosed herein. The at least one display device may be connected to at least one processing unit for receiving a plurality of display signals forming the screen output. The display device may be a monitor connected to the processing unit. The recording apparatus may be connected to the at least one processing unit in a way that the recording apparatus functions independent of the connected processing unit. The recording apparatus may be a stand alone electronic device attached to the processing unit via a cable. The processing unit may not require any additional software to be specifically installed for communicating with the recording apparatus. The necessary configuration may be automatically installed as the cable is connected to a port on the processing unit. The port of the processing unit may be a USB port. According to an embodiment, the screen output is an image and the recording apparatus is an image recorder.

The recording apparatus may comprise of the following configuration at a minimum, 2.64 GHz Processor with a minimum of 4 GB RAM
VGA capture card
Ethernet Connection
350 GB of Hard Drive
32 bit operating system such as Windows XP or Windows 7

FIG. 1 illustrates a block diagram of a system according to an embodiment of the disclosure. As illustrated, the system 100 comprises a display unit 102, a processing unit 104 and a recording apparatus 200. The processing unit 104 is in signal communication with the display device 102. The recording device 200 may be configured between the processing unit 104 and the display device 102 such that the recording device 200 is configured to record and store a replica of one or more display signals transmitted from the processing unit 104 to the display unit 102. According to an embodiment, the system may also work with a plurality of processing units, a plurality of display devices and the recording device configured between the plurality of processing units and the plurality of display devices.

Figure 2:
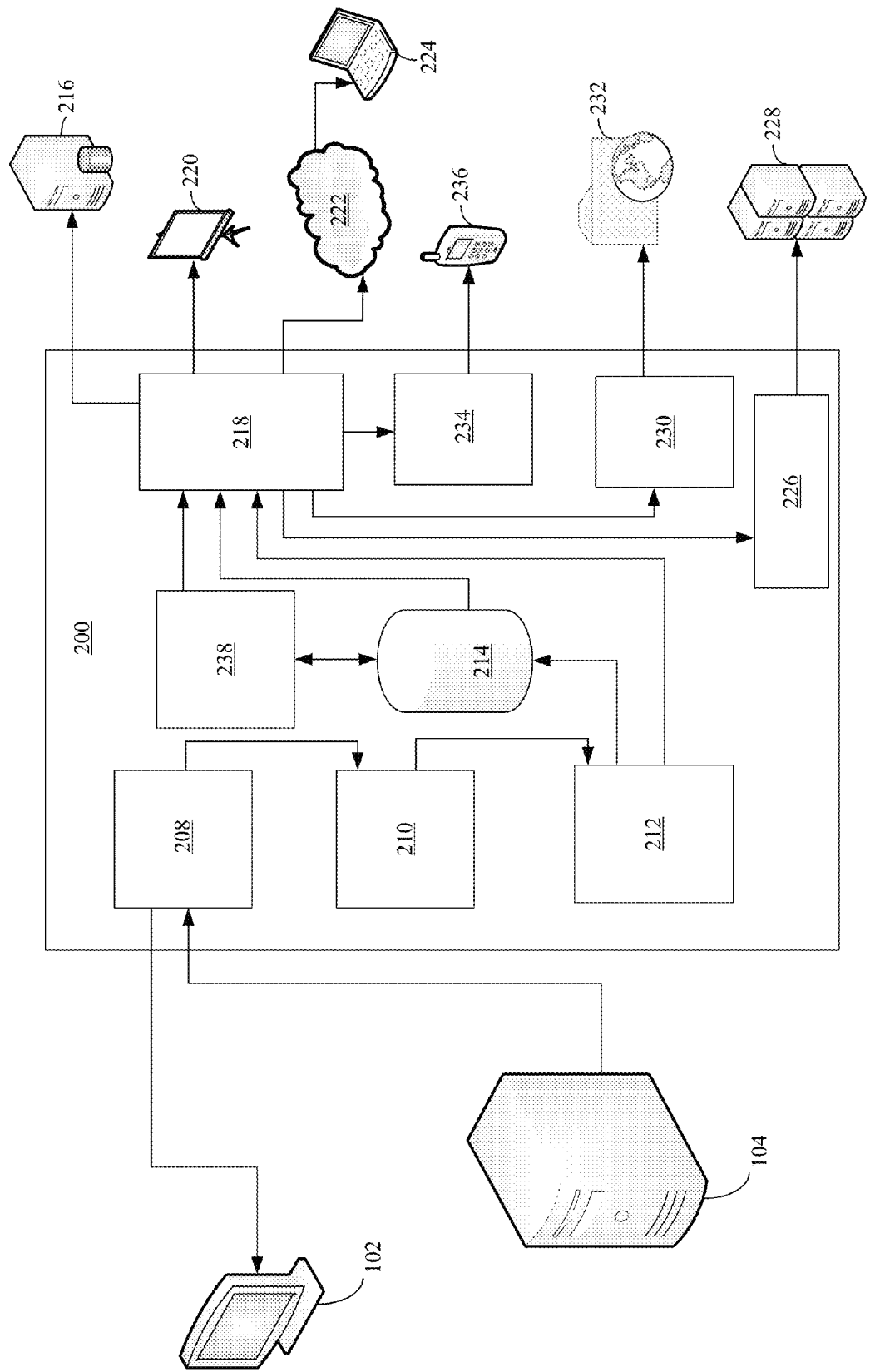
FIG. 2 illustrates a block diagram of a recording apparatus for storing a screen output of a display device in accordance with an embodiment of the disclosure.

FIG. 2 illustrates a block diagram of a recording apparatus 200 for storing a screen output of a display device 102 in accordance with an embodiment of the disclosure. The display device 102 may be any suitable display unit such as but not limited to monitors. The display device 102 may be connected to a processing unit 104 for receiving a plurality of display signals forming the screen output. The display device 102 may be connected to a processing unit 104 through a suitable wired connection such as, but not limited to cable etc. or through a wireless connection such as, but not limited to Bluetooth™, WLAN, infrared etc. The recording apparatus 200 may be configured between the processing unit 104 and the display unit 102. The recording device may be so configured to intercept the connection between the processing unit 104 and the display unit 102.

The recording apparatus 200 may comprise of a splitter 208. The splitter 208 may be configured to route the display signals from the processing unit 104 to the display device 102. The splitter 208 may be further configured for generating a replica of the plurality of display signals corresponding to the screen output of the display device 102. The replica of display signals may be forwarded to an input interface 210. The splitter 208 may not interfere with the display signals sent from the processing unit 104 to the display device 102. According to another embodiment of the disclosure, the splitter 208 may be a display splitter.

According to an alternate embodiment, the splitter 208 may be a standalone device configured to connect the recording apparatus 200 and the processing unit 104.

According to an embodiment, the input interface 210 may be a quality control module configured for checking the quality of signals received, checking for errors, etc. The input interface 210 may be further configured to receive input from a user for controlling the working of the recording apparatus 200.

The recording apparatus 200 may further comprise of a recorder 212 configured for receiving the replica of the plurality of display signals from the input interface 210 and further configured for capturing the screen output from the replica of the plurality of display signals. The recorder 212 may be further configured to store the screen output corresponding the replica of the plurality of display signals in a data repository 214. According to an embodiment, the screen output may be an image extracted from the replica of plurality of display signals.

According to an alternate embodiment, the recorder 200 may also be configured to store the screen outputs on an external database storage 216 in communication with the recording apparatus 200.

The recording apparatus 200 may further comprise of an output interface 218. The output interface 218 may be configured to provide an access to the recorded media stored or captured by the recorder 212 such that the recorded media may be displayed on an user interface 220 in communication with the recording apparatus 200. According to an embodiment, the recorded media may be displayed as a sequence of images appearing as a video. According to another embodiment, the user interface 220 may be a screen or a monitor. According to another embodiment, the output interface 218 may also be configured for playing the screen output on an Internet cloud 222 for a plurality of remote users 224 of the cloud.

The recording apparatus 200 may further comprise of a third party interface 226 for communicating with a third party application 228 for displaying the screen output to the users of the third party application 228. The third party interface 226 may receive the screen outputs stored in the data repository 214 or the screen outputs captured by the recorder 212 from the output interface 218. According to an embodiment, the third party may be a bank or a financial institution and the third party application 228 may be any internal software.

According to yet another embodiment, the recording apparatus 200 may have an inbuilt user interface for displaying the recorded media.

The recording apparatus 200 may further comprise of a web interface 230 for displaying the screen output on a web page 232 or a web portal. The web interface 230 may receive the screen outputs stored in the data repository 214 or the screen outputs captured by the recorder 212 from the output interface 218.

The recording apparatus 200 may further comprise of a mobile interface 234 for communicating with one or more mobile devices 236 for displaying the screen output. The mobile interface 234 may receive the screen outputs stored in the data repository 214 or the screen outputs captured by the recorder 212 from the output interface 218.

According to yet another embodiment, the recording apparatus 200 may also be accessed from the remote users 224 of the cloud 222 or users of web page 232 or mobile device 236 users or users of third party application 228 such that the recorded information may be accessed and played back.

The recording apparatus 200 further comprises of an event module 238 for retrieving the stored screen output from the data repository 214 upon triggering of an event and forwarding the screen output to the output interface 218 for playing backward. According to an embodiment, the stored screen output may be played on the user interface 220 in communication with the recording apparatus 200 as a sequence of images. The event may a user defined parameter containing a condition to execute the stored screen output at a particular time or date. The stored screen output may be played as the sequence of images in any chronological order as described by the user defined parameter. Alternatively, the event may be an error in the processing unit 204 or a fault in the transmission of the plurality of display signals to the display device 202.

Figure 3:
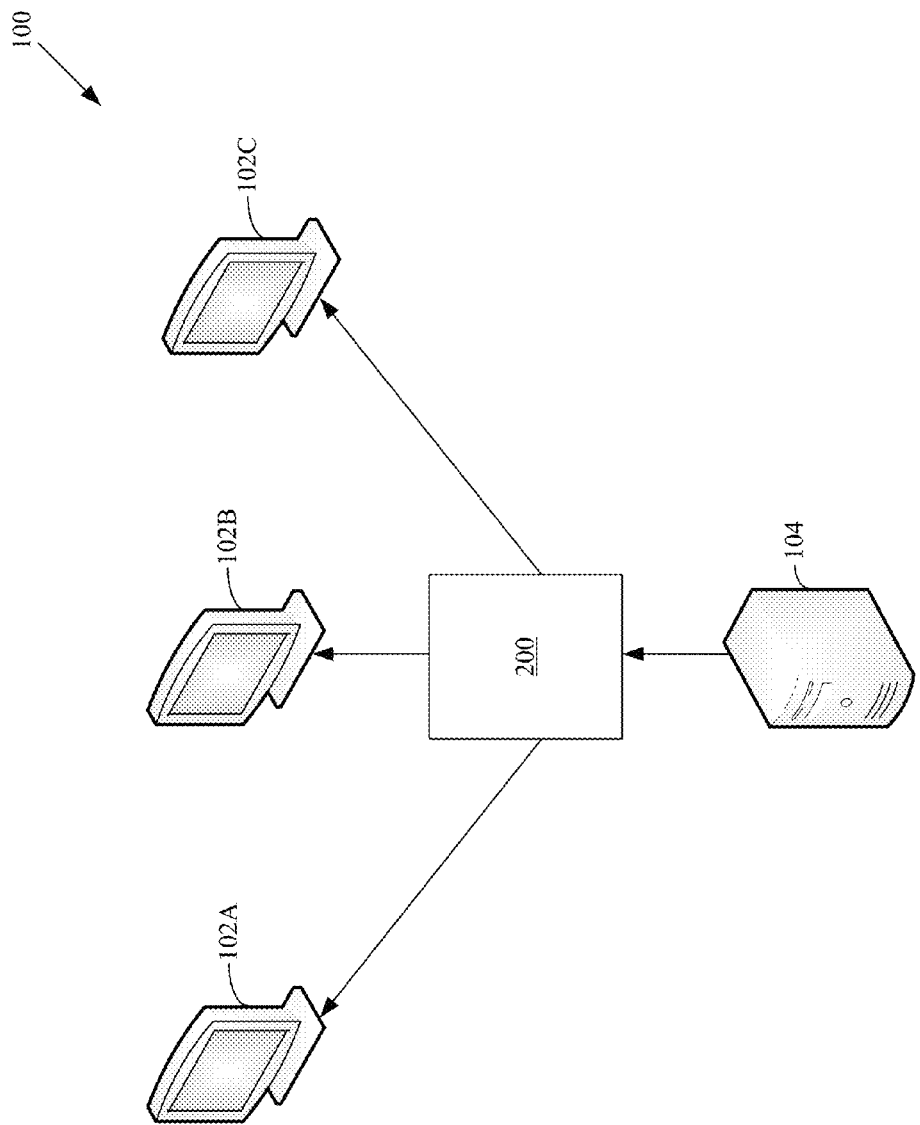
FIG. 3 illustrates a block diagram of a system in accordance with another embodiment of the disclosure.

FIG. 3 illustrates a block diagram of a system 100 in accordance with another embodiment of the disclosure. The recording apparatus 200 may be configured for receiving the plurality of display signals of a plurality of display device 102A, 102B, 102C from the processing unit 104 and routing the plurality of display signals to the plurality of display devices 102A, 102B, 102C being connected to the recording apparatus 200 such that each display device 102A, 102B, 102C receives a plurality of display signals. The recording apparatus 200 may be further configured for generating the replica of the plurality of display signals for each of the plurality of display devices 102A, 102B, 102C received from the processing unit 104 and capturing a plurality of screen outputs from the replica of the plurality of display signals for each of the plurality of display devices 102A, 102B, 102C and storing the screen outputs in the data repository 214 for further use.

Figure 4:
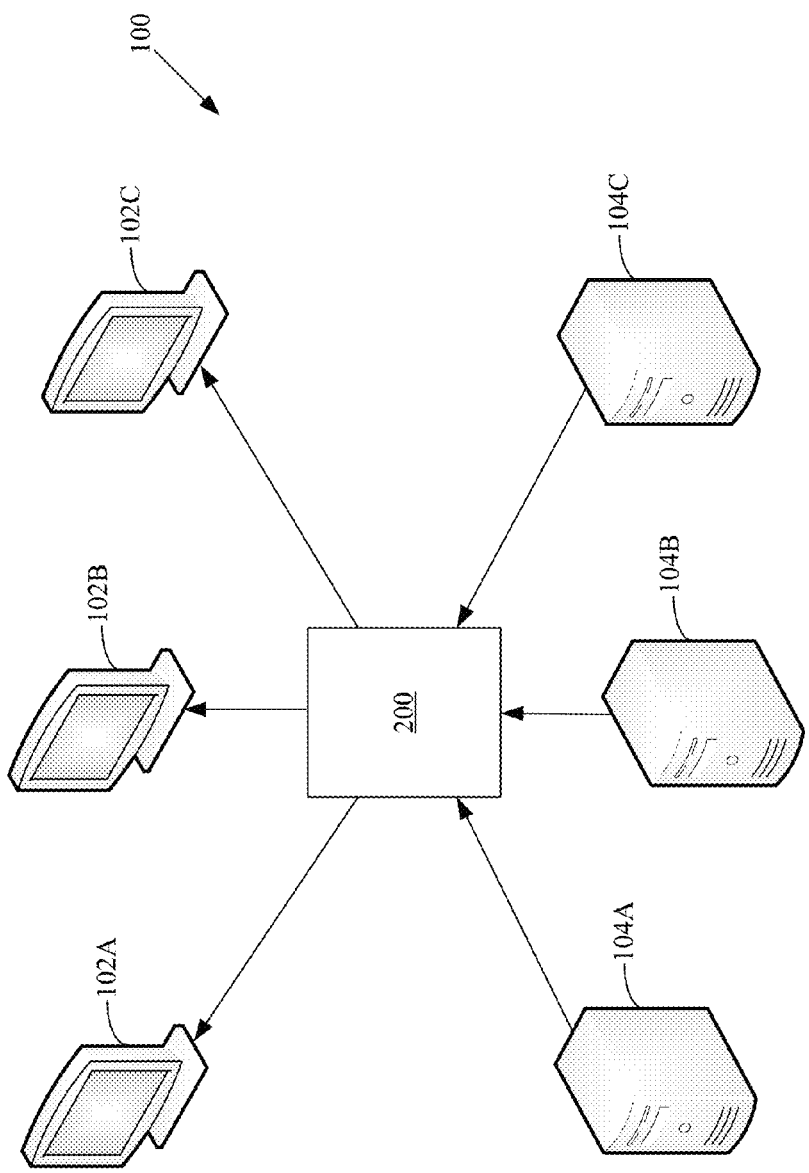
FIG. 4 illustrates a block diagram of a system in accordance with another embodiment of the disclosure.

FIG. 4 illustrates a block diagram of a system 100 in accordance with another embodiment of the disclosure. The recording apparatus 200 may be configured for receiving the plurality of display signals from a plurality of processing units 104A, 104B, 104C such that each processing unit 104A, 104B, 104C may be transmitting a plurality of display signals and forwarding the plurality of display signals to a plurality of display devices 102A, 102B, 102C being connected to the recording apparatus 200 such that each display device 102A, 102B, 102C shows the screen outputs corresponding the plurality of display signals from the plurality of processing units 104A, 104B, 104C. The display devices 102A, 102B, 102C may be configured to show more than one screen outputs simultaneously. The recording apparatus 200 may be further configured for generating the replica of the plurality of display signals received from the plurality of processing unit 104A, 104B, 104C and capturing a plurality of screen outputs from the replica of the plurality of display signals and storing the screen outputs in the data repository 214 for further use.

According to yet another embodiment, a method of storing the screen output of the at least one display device 102 on the recording apparatus 200 is also disclosed. The at least one display device 102 may be connected to the at least one processing unit 104 for receiving the plurality of display signals forming the screen output and the recording apparatus 200 may be connected to the at least one processing unit 104 in a way that the recording apparatus 200 functions independent of the connected processing unit 104. The method comprises steps of generating the replica of the plurality of display signals by the recording apparatus 200 such that the replica of the plurality of display signals corresponds to the screen output and storing the screen output corresponding the replica of the plurality of display signals in the recording apparatus 200.

According to an embodiment of the disclosure, generating the replica of the plurality of display signals includes splitting the plurality of display signals such that the plurality of display signals are directed to the at least one display device 102 and the replica of the plurality of display signals are directed to the recording apparatus 200.

According to another embodiment of the disclosure, storing the replica of the plurality of display signals includes capturing the screen output from the replica of plurality of display signals and thereon storing the screen output in the recording apparatus 200.

According to another embodiment, a method of identifying an event by playing stored screen output of the at least one display device 102 is also disclosed. The at least one display device 102 may be connected to the at least one processing unit 104 for receiving the plurality of display signals corresponding to the screen output. The screen output may be stored on the recording apparatus 200, which records the replica of the plurality of display signals sent from the at least one processing unit 104 to the at least one display device 102. The method comprises steps of retrieving the stored screen output from the data repository 214 of the recording apparatus 200 upon identifying the event and playing the stored screen output onto the user interface 220 in communication with the recording apparatus 200 as a sequence of images.

According to an embodiment of the disclosure, the method further comprises of retrieving the stored screen output from the data repository 214 of the recording apparatus 200 upon triggering of a user defined parameter and playing the stored screen output onto the user interface 220 in communication with the recording apparatus 200 as a sequence of images. The user defined parameter may be a condition provided by the user to execute the stored screen output.

According to another embodiment of the disclosure, playing the stored screen output includes playing the stored screen output as the sequence of images in any chronological order as described by the condition of the user defined parameter.

According to another embodiment of the disclosure, retrieving the stored screen output from the data repository 214 of the recording apparatus 200 upon an error in the processing unit 104 or a fault in the transmission of the plurality of display signals to the display device 102.

According to a specific example of the disclosure, the recording apparatus 200 may be used in aircrafts or manufacturing plants in case of a critical failure or a catastrophic event. The recording apparatus 200 may assist in re-creating the event. The recording apparatus 200 records all the screen shots of the operator's monitor screen in the data repository 214 with real-time stamp. In a specific time period, the recording apparatus 200 gives a user the ability to go see exactly what was being displayed on the monitor as a real time movie during the failure event. Additionally, the recording apparatus 200 may be interfaced with existing transaction and real-time historical databases such that at any specific time, the user may view the monitor screen movie along with the other transaction data related to the failure event.

The recording apparatus 200, as disclosed above, captures, stores, archives, and plays back screen output of a display device. The recording apparatus 200 uses web technologies and does not require any custom software to be installed on the processing unit 104. The recording apparatus 200 comprises of a recorder 212 along with storage and computing hardware that has web-hosting capabilities.

The recording apparatus 200 comprises of an intelligent and integrated playback mechanism. The recording apparatus 200 enables an integrated and seamless viewing experience to clients. The clients may be a web page, a third party custom application or mobile clients.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required or essential feature.

While specific language has been used to describe the disclosure, any limitations arising on account of the same are not intended. As would be apparent to a person in the art, various working modifications may be made to the method in order to implement the inventive concept as taught herein.

What is claimed is:

1. A recording apparatus for storing a screen output of at least one display screen device; the at least one display screen device being connected to at least one processing unit for receiving display screen signals forming the screen output and the recording apparatus being connected to at least one processing unit in a way that the recording apparatus functions independent of the connected processing unit, the recording apparatus comprising:
   a splitter connected to at least one processing unit and configured for splitting the display signals corresponding to the screen output into a replica;
   an input interface configured for receiving the replica of the display signals from the splitter;
   a recorder configured for receiving the replica of the display signals from the input interface and capturing the screen output from the replica of the display signals thereon; and
   a data repository configured for storing the screen output.

2. The recording apparatus as claimed in claim 1 further comprising an output interface configured for playing the screen output on an user interface in communication with the recording apparatus.

3. The recording apparatus as claimed in claim 2 wherein the user interface is a display screen or a monitor.

4. The recording apparatus as claimed in claim 2 further comprising an event module configured for retrieving the stored screen output from the data repository upon triggering of an event and forwarding the screen output to the output interface for play back.

5. The recording apparatus as claimed in claim 1 further comprising a third party interface configured to communicate with a third party application for displaying the screen output to the users of the third party application.

6. The recording apparatus as claimed in claim 1 further comprising a web interface configured for displaying the screen output on a web page or a web portal.

7. The recording apparatus as claimed in claim 1 further comprising a mobile interface configured to communicate with one or more mobile devices for displaying the screen output.

8. The recording apparatus as claimed in claim 1 is a non-camera based display screen image recorder.

9. The recording apparatus as claimed in claim 1 wherein the display screen output is an image.

10. The recording apparatus as claimed in claim 1 wherein the splitter is a display screen signal splitter.

11. The recording apparatus as claimed in claim 1 is being connected to the processing unit via a cable.

12. The recording apparatus as claimed in claim 1 further configured for: splitting the display screen signals received from at least one processing unit by the splitter into a replica; capturing the screen outputs from the replica of the display signals; and storing the screen outputs in the data repository.

13. The recording apparatus as claimed in claim 1 wherein the splitter is configured to: receiving from one processing unit, the display signals of a plurality of display devices; and routing the display signals to the plurality of display devices.

14. The recording apparatus as claimed in claim 13 further configured for: splitting each of the display signals received from the processing unit for each of the plurality of display devices into the replica; capturing a plurality of screen outputs from the replica for each of the plurality of display devices; and storing the screen outputs in the data repository.

15. The recording apparatus as claimed in claim 1 further configured for: receiving the display signals transmitted from a plurality of processing units through the splitter; and routing the display signals to a plurality of display devices.

16. The recording apparatus as claimed in claim 15 further configured for: splitting the display signals received from the plurality of processing units into a replica; capturing a plurality of screen outputs from the replica of the display signals; and storing the screen outputs in the data repository.

17. A method of storing a display screen output of at least one display device on a recording apparatus; the at least one display device being connected to at least one processing unit for receiving a display signal forming the screen output and the recording apparatus being connected to at least one processing unit in a way that the recording apparatus functions independent of the connected processing unit, the method comprising steps of:
   receiving, by the recording apparatus, a replica of the display signals from a splitter such that the replica corresponds to the screen output; and
   storing the screen output corresponding the replica of the display signals in the recording apparatus.

18. The method as claimed in claim 17 wherein the receiving is preceded by splitting the display signals such that the display signal is directed to the at least one display device and the replica of the display signal is directed to the recording apparatus.

19. The method as claimed in claim 17 wherein storing the replica of the display signals includes capturing the screen output from the replica the display signals and thereon storing the screen output in the recording apparatus.

20. A system comprising:
   at least one processing unit for transmitting a plurality of display signals;
   at least one display device connected to at least one processing unit for receiving the plurality of display signals forming a screen output; and a recording apparatus configured between at least one processing unit and at least one display device such that the recording apparatus is configured to record and store a replica of the plurality of display signals transmitted from at least one processing unit to at least one display unit; the recording apparatus comprising:
- a splitter connected to at least one processing unit and configured for splitting the plurality of display signals corresponding to the screen output into a replica;
- an input interface configured for receiving the replica of the plurality of display signals from the splitter;
- a recorder configured for receiving the replica of the plurality of display signals from the input interface and capturing the screen output from the replica of the plurality of display signals thereon; and
- a data repository configured for storing the screen output.

* * * * *